United States Patent
Qi et al.

(10) Patent No.: US 12,199,941 B2
(45) Date of Patent: Jan. 14, 2025

(54) COMMUNICATION METHOD AND APPARATUS

(71) Applicant: HUAWEI TECHNOLOGIES CO., LTD., Guangdong (CN)

(72) Inventors: Min Qi, Shenzhen (CN); Wutao Wang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 18/140,779

(22) Filed: Apr. 28, 2023

(65) Prior Publication Data
US 2023/0269216 A1 Aug. 24, 2023

Related U.S. Application Data

(63) Continuation of application No. PCT/CN2021/126346, filed on Oct. 26, 2021.

(30) Foreign Application Priority Data

Oct. 30, 2020 (CN) .......................... 202011193498.X

(51) Int. Cl.
*H04L 61/2517* (2022.01)
*H04L 61/4511* (2022.01)

(52) U.S. Cl.
CPC ...... *H04L 61/2517* (2013.01); *H04L 61/4511* (2022.05)

(58) Field of Classification Search
None
See application file for complete search history.

(56) References Cited

U.S. PATENT DOCUMENTS

| 8,289,968 B1* | 10/2012 | Zhuang | H04L 61/2532 370/252 |
| 2006/0045068 A1* | 3/2006 | Wu | H04L 61/2567 370/352 |
| 2018/0262467 A1* | 9/2018 | Jayawardena | H04L 63/0254 |

FOREIGN PATENT DOCUMENTS

| CN | 105100299 A | 11/2015 |
| CN | 103024089 B | 2/2016 |

OTHER PUBLICATIONS

P. Srisuresh et al, IP Network Address Translator (NAT) Terminology and Considerations, Network Working Group Request for Comments: 2663, Aug. 1999, total 30 pages.

(Continued)

*Primary Examiner* — Younes Naji
(74) *Attorney, Agent, or Firm* — WOMBLE BOND DICKINSON (US) LLP

(57) ABSTRACT

This application relates to the field of communication technologies, and discloses a communication method and apparatus, to improve a ratio of translation between an external network IP address and an internal network IP address, and improve utilization of the external network IP address. The method includes: receiving an outbound packet sent by an internal network device to an external network, where the outbound packet carries an internal network Transaction-ID, and the Transaction-ID marks a group including a domain name system DNS outbound packet and a corresponding inbound packet; assigning an external network IP, an external network port number, and an external network Transaction-ID to the outbound packet; and replacing a source IP, a source port number, and the internal network Transaction-ID of the outbound packet with the external network IP, the external network port number, and the external network Transaction-ID, and then sending the outbound packet.

17 Claims, 3 Drawing Sheets

(56) References Cited

OTHER PUBLICATIONS

P. Srisuresh et al, Traditional IP Network Address Translator (Traditional NAT), Network Working Group Request for Comments: 3022, Jan. 2001, total 16 pages.
R. Mahy et al, Traversal Using Relays around Nat (TURN): Relay Extensions to Session Traversal Utilities for NAT (STUN), Internet Engineering Task Force (IETF) Request for Comments: 5766, Apr. 2010, total 67 pages.

* cited by examiner

COMMUNICATION METHOD AND APPARATUS

CROSS-REFERENCE TO RELATED APPLICATIONS

This application is a continuation of International Application No. PCT/CN2021/126346, filed on Oct. 26, 2021, which claims priority to Chinese Patent Application No. 202011193498.X, filed on Oct. 30, 2020. The disclosures of the aforementioned applications are hereby incorporated by reference in their entireties.

TECHNICAL FIELD

Embodiments of this application relate to the field of communication technologies, and in particular, to a communication method and apparatus.

BACKGROUND

A network address translation (NAT) technology is widely used in a telecom carrier network for translation between external network addresses and internal network addresses. A carrier-grade NAT (CGN) device is deployed, so that a carrier may effectively use limited internal network internet protocol (IP) addresses, to provide internet access services for more users. However, with exhaustion of all global internet protocol version 4 (IPv4) addresses, external network IP address resources become increasingly strained. Therefore, a network address translation solution that makes more effective use of external network IP addresses is needed.

SUMMARY

Embodiments of this application provide a communication method and apparatus, to improve a ratio of translation between an external network IP address and an internal network IP address, and improve utilization of the external network IP address.

According to a first aspect, this application provides a communication method. The method includes: receiving an outbound packet sent by an internal network device to an external network, where the outbound packet carries an internal network transaction ID Transaction-ID, and the Transaction-ID marks a group including a domain name system DNS outbound packet and a corresponding inbound packet; assigning an external network IP, an external network port number, and an external network Transaction-ID to the outbound packet; and replacing a source IP, a source port number, and the internal network Transaction-ID of the outbound packet with the external network IP, the external network port number, and the external network Transaction-ID, and then sending the outbound packet.

According to the foregoing method, on a basis of performing network address translation in two dimensions of a network layer and a transport layer in a conventional technology, a network address translation technology based on a DNS application layer Transaction-ID is proposed for an application layer feature of a DNS protocol. By using the network address translation technology based on the DNS application layer Transaction-ID, network address translation processing may be performed in three dimensions of a network layer (an IP address), a transport layer (a UDP port), and an application layer (a Transaction-ID), to improve a ratio of translation between an external network IP address and an internal network IP address. In this way, utilization of the external network IP is improved.

In an embodiment, the assigning an external network IP, an external network port number, and an external network Transaction-ID to the outbound packet includes: assigning the external network IP, the external network port number, and the external network Transaction-ID to the outbound packet based on a configured network address translation NAT mapping table and the source IP, the source port number, and the internal network Transaction-ID that are of the outbound packet, where the NAT mapping table includes a plurality of mapping relationships between an internal network IP, an internal network port number, and an internal network Transaction-ID and an external network IP, an external network port number, and an external network Transaction-ID.

In an embodiment, the assigning an external network IP, an external network port number, and an external network Transaction-ID to the outbound packet includes: assigning a group including an unoccupied external network IP, an external network port number, and an external network Transaction-ID to the outbound packet in a resource set of external network IPs, external network port numbers, and external network Transaction-IDs. In an embodiment, the external network Transaction-ID assigned to the outbound packet is the same as or different from the internal network Transaction-ID of the outbound packet.

In an embodiment, a static translation or dynamic translation manner may be used to translate the source IP (namely, the internal network IP), the source port number (namely, the internal network port number), and the internal network Transaction-ID of the outbound packet into the external network IP, the external network port number, and the external network Transaction-ID. This enriches implementations of network address translation, and helps satisfy different communication requirements.

In an embodiment, a mapping relationship between the source IP, the source port number, and the internal network Transaction-ID that are of the outbound packet and the external network IP, the external network port number, and the external network Transaction-ID that are assigned to the outbound packet is recorded into a NAT mapping table.

In an embodiment, if a dynamic translation manner is used, the mapping relationship between the source IP address (the internal network IP), the source port number (the internal network port number), and the internal network Transaction-ID that are of the outbound packet and the external network IP, the external network port number, and the external network Transaction-ID that are assigned to the outbound packet is recorded in the NAT mapping table, to facilitate identification and determining of the internal network IP, the internal network port number, and the internal network Transaction-ID that correspond to the inbound packet sent from the external network to the internal network device. This ensures reliability of transmission of the inbound packet.

In an embodiment, the method further includes: receiving the inbound packet sent by the external network to the internal network device, where the inbound packet carries the external network Transaction-ID; assigning the internal network IP, the internal network port number, and the internal network Transaction-ID to the inbound packet based on the NAT mapping table and a destination IP, a destination port number, and the external network Transaction-ID that are of the inbound packet; and replacing the destination IP, the destination port number, and the external network Transaction-ID of the inbound packet with the internal network IP, the internal network port number, and the internal network Transaction-ID, and then sending the inbound packet.

In an embodiment, the destination IP, the destination port number, and the external network Transaction-ID of the inbound packet sent from the external network to the internal network device are translated based on the NAT mapping table. This helps ensure that the internal network device accurately receives the inbound packet, and improves reliability of transmission of the inbound packet.

According to a second aspect, an embodiment of this application provides a communication apparatus. The apparatus has a function of implementing the method according to any one of the first aspect or the possible designs of the first aspect. The function may be implemented by hardware, or may be implemented by hardware executing corresponding software. The hardware or software includes one or more units (modules) corresponding to the foregoing function, for example, a communication unit and a processing unit.

In an embodiment, the apparatus may be a chip or an integrated circuit.

In an embodiment, the apparatus includes a processor and a communication interface. The processor is coupled to the communication interface, and is configured to implement the method according to any one of the first aspect or the possible designs of the first aspect. It may be understood that the communication interface may be a transceiver or an input/output interface. The apparatus may further include a memory, and the memory stores a program that may be executed by the processor to implement the method according to any one of the first aspect or the possible designs of the first aspect.

In an embodiment, the apparatus may be a NAT device.

According to a third aspect, this application provides a computer-readable storage medium. The storage medium stores computer instructions. When the computer instructions are executed, the method according to any one of the first aspect or the possible designs of the first aspect may be implemented.

According to a fourth aspect, this application further provides a computer program product including a computer program or instructions. When the computer program or the instructions are executed, the method according to any one of the first aspect or the possible designs of the first aspect may be implemented.

According to a fifth aspect, an embodiment of this application provides a chip. The chip is configured to execute a computer program or instructions stored in a memory, to implement the method according to any one of the first aspect or the possible designs of the first aspect.

For technical effects that can be achieved in the second aspect to the fifth aspect, refer to technical effects that can be achieved in the first aspect. Details are not described herein again.

DESCRIPTION OF EMBODIMENTS

Figure 1:
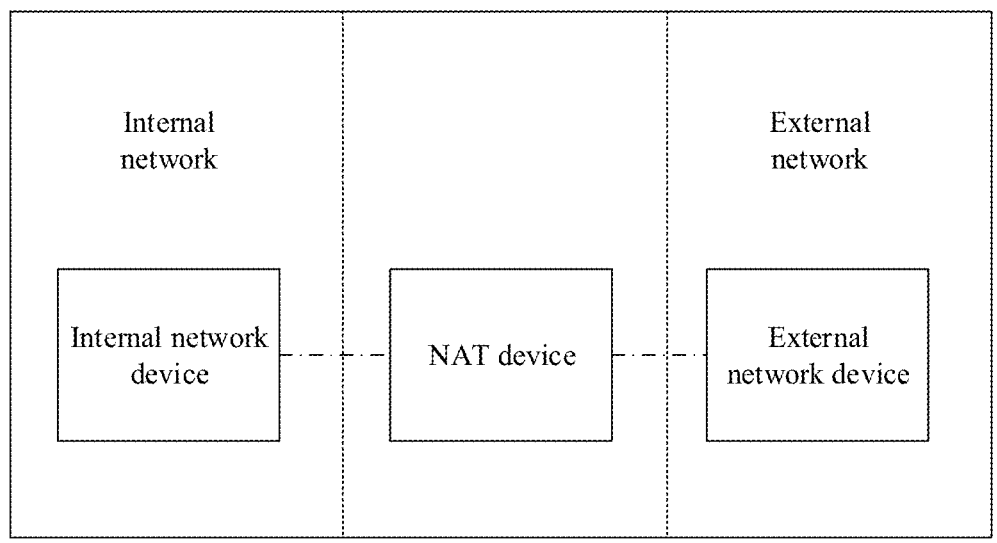
FIG. 1 is a schematic diagram of an architecture of a communication system according to an embodiment of this application.

FIG. 1 is a schematic diagram of an architecture of a possible communication system according to an embodiment of this application. The system includes a NAT device, an internal network device, and an external network device. The NAT device may divide a network into an internal network and an external network. The internal network may also be referred to as a private network or a private network, for example, a local area network (LAN) used by an enterprise user or a home user. The external network may also be referred to as a public network or a public network, for example, a wide area network (WAN), namely, an internet. A device that uses the internal network for communication is referred to as the internal network device, and a device that uses the external network for communication is referred to as the external network device. The NAT device is located between the internal network and the external network. The internal network device communicates with the external network device through the NAT device. For example, after an internal network address of a packet sent by the internal network device passes through the NAT device, the internal network address is represented by an external network address translated by the NAT device in the external network. The external network device knows only the translated external network address, but does not know the internal network address of the packet. Similarly, after an external network address of a packet sent by the external network device passes through the NAT device, the external network address is represented by an internal network address translated by the NAT device in the internal network. The internal network device knows only the translated internal network address but does not know the external network address of the packet.

Before embodiments of this application are described, some terms in this application are first described, to help persons skilled in the art have a better understanding.

(1) The NAT technology was proposed in 1994. When some devices in the private network (namely, the internal network) are already assigned local IP addresses (namely, internal network IP addresses), but want to communicate with devices in the internet (namely, the external network), a NAT method may be used. In this method, NAT software needs to be installed on a router that connects the internal network to the external network. The router on which the NAT software is installed may also be referred to as a NAT router, and the router has at least one valid external network IP address. In this way, when a device in the internal network communicates with the external network, an internal network IP address of the device needs to be translated into an external network IP address on the NAT router, so that the device can be connected to the external network.

Currently, in a basic-NAT technology, only an IP address is translated. In an embodiment, when an outbound packet sent by the internal network device to the external network passes through the NAT device, an internal network IP address in the outbound packet is translated into an external network IP address, the external network IP address in an inbound packet sent by the external network device to the internal network is translated into the internal network IP address, and a ratio of translation between the external network IP address and the internal network IP address is 1:1. For ease of description, in subsequent descriptions of this application, the IP address may also be referred to as an IP for short. Details are not described again.

For example, for an outbound packet sent by the internal network device to the external network, an example in which an internal network IP in the outbound packet is translated into an external network IP is shown in Table 1. "Src IP" represents a source IP, "Dst IP" represents a destination IP, and the Src IP in the outbound packet carries a local IP of the internal network device, namely, the internal network IP. The NAT device translates the Src IP in the outbound packet from the internal network IP into the external network IP, for example, translates a UIP1 into an EIP1, and translates a UIP2 into an EIP2. "UIP" represents the internal network IP, and "EIP" represents the external network IP. It may be shown in Table 1 that a ratio of translation between the internal network IP and external network IP is 1:1.

TABLE 1

| Outbound packet (internal network) | | Outbound packet (external network) | |
|---|---|---|---|
| Src IP | Dst IP | Src IP | Dst IP |
| UIP1 | DIP1 | EIP1 | DIP1 |
| UIP2 | DIP1 | EIP2 | DIP1 |
| UIP3 | DIP1 | EIP3 | DIP1 |
| UIP4 | DIP1 | EIP4 | DIP1 |

(2) A network address and port translation (NAPT) technology is an enhancement of the basic-NAT technology, and port dimension processing is added. The technology uses a valid external network IP, and different user datagram protocol (UDP) port numbers correspond to different internal network IPs. In an embodiment, translation between <the internal network IP+an internal network port number> and <the external network IP+an external network port number> is applicable to a scenario in which an enterprise has only one external network IP, but a plurality of devices need to access the external network or are accessed by the external network.

For example, for an outbound packet sent by the internal network device to the external network, an example in which an internal network IP and an internal network port number in the outbound packet are translated into an external network IP and an external network port is shown in Table 2. "Port" represents a transport layer protocol, "Src IP" represents a source IP, "Src port" represents a source port, "Dst IP" represents a destination IP, and "Dst port" represents a destination port. The NAT device translates the Src IP and the Src port in the outbound packet from the internal network IP and the internal network port number into the external network IP and the external network port number, for example, translates a UIP1 and a Uport1 into an EIP1 and an Eport1. "UIP" represents the internal network IP, "Uport" represents the internal network port, "EIP" represents the external network IP, and "Uport" represents the external network port. Currently, an IP has 65536 UDP ports. After the NAPT technology is used, theoretically, one external network IP may provide services for 65536 internal network devices. That is, each UDP port of the external network IP corresponds to a different internal network IP. In actual use, a ratio of translation that one external network IP address provides services for 128 internal network IPs can also be reached.

TABLE 2

| Outbound packet (internal network) | | | | | Outbound packet (external network) | | | | |
|---|---|---|---|---|---|---|---|---|---|
| Prot | Src IP | Src port | Dst IP | Dst port | Prot | Src IP | Src port | Dst IP | Dst port |
| UDP | UIP1 | Uport1 | DIP1 | Dport1 | UDP | EIP1 | EPort1 | DIP1 | Dport1 |
| UDP | UIP1 | Uport2 | DIP1 | Dport1 | UDP | EIP1 | EPort2 | DIP1 | Dport1 |
| UDP | UIP2 | Uport2 | DIP1 | Dport1 | UDP | EIP2 | EPort3 | DIP1 | Dport1 |
| UDP | UIP2 | Uport3 | DIP1 | Dport1 | UDP | EIP2 | EPort4 | DIP1 | Dport1 |
| UDP | UIP3 | Uport4 | DIP1 | Dport1 | UDP | EIP3 | EPort5 | DIP1 | Dport1 |

(3) NAT device: In embodiments of this application, the NAT device may be a device such as a router, a gateway, or a switch that has a network address translation function, or may be a CGN device or the like.

Currently, the NAT technology operates at a network layer and a transport layer, and processing on a domain name system (DNS) feature of an application layer protocol is not performed. As a result, the ratio of translation between the external network IP and the internal network IP is low. In addition, with exhaustion of global IPv4 addresses, external network IP resources become increasingly tense. How to improve a ratio of translation between network addresses and improve utilization of external network IPs as much as possible becomes a problem to be resolved.

A DNS protocol is widely used in the internet and is the most widely used protocol. In some carrier networks, a proportion of DNS connections is up to 48%, which is higher than that of protocols such as the hypertext transfer protocol (HTTP), the hypertext transfer protocol secure (HTTPS), and the quick UDP internet connection (QUIC). This application is intended to focus on a DNS protocol feature, and add DNS application layer Transaction-ID dimension processing based on dimensions of a network layer (an IP address) and a transport layer (a UDP port) used in an existing NAPT technology, to improve a ratio of translation between an external network IP address and an internal network IP address. The following describes in detail embodiments of this application with reference to accompanying drawings.

In addition, it should be understood that in embodiments of this application, at least one may be alternatively described as one or more, and more may represent two, three, four, or more. This is not limited in this application. In embodiments of this application, "I" may represent an "or" relationship between associated objects. For example, A/B may represent A or B. "And/or" may be used to represent that there are three relationships between associated objects. For example, A and/or B may represent the following three cases: Only A exists, both A and B exist, and only B exists. A and B may be singular or plural. To facilitate description of the technical solutions in embodiments of this application, in embodiments of this application, terms such as "first" and "second" may be used to distinguish between technical features with same or similar functions. The terms such as "first" and "second" do not limit a quantity and an execution sequence, and the terms such as "first" and "second" do not indicate a definite difference. In embodiments of this application, the term such as "example" or "for example" is used to represent an example, an illustration, or a description. Any embodiment or design scheme described with "example" or "for example" should not be explained as being more preferred or having more advantages than another embodiment or design scheme. Use of the term such as "example" or "for example" is intended to present a related concept in a manner for ease of understanding.

Figure 2:
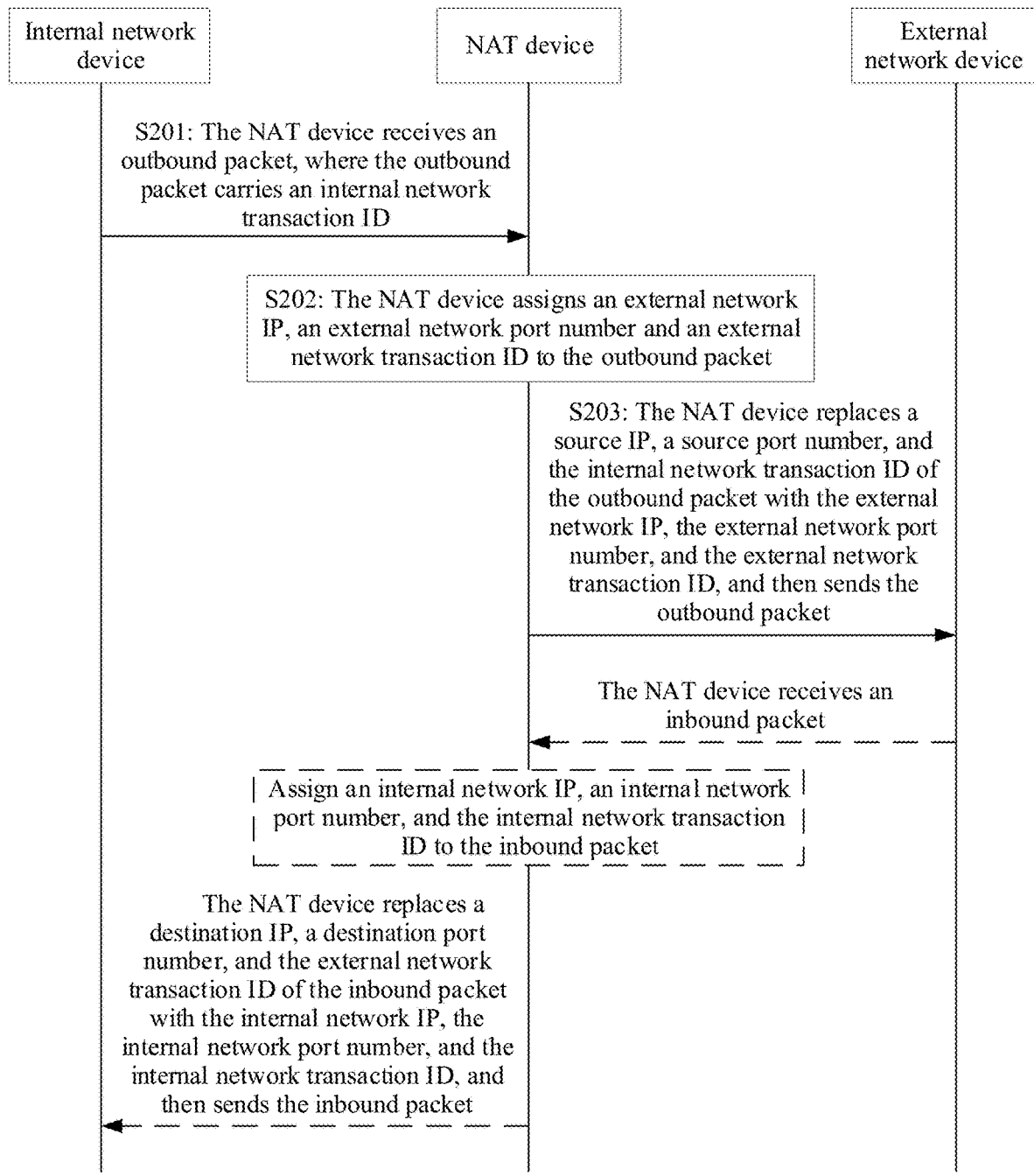
FIG. 2 is a schematic diagram of a communication process according to an embodiment of this application.

FIG. 2 is a schematic diagram of a communication process according to an embodiment of this application. The process includes the following operations.

S201: A NAT device receives an outbound packet sent by an internal network device to an external network, where the outbound packet carries an internal network transaction ID (Transaction-ID), and the Transaction-ID marks a group including a DNS outbound packet and a corresponding inbound packet.

A difference from an existing DNS packet that uses a DNS protocol is that an IP protocol is used only at a network layer, a UDP protocol is used at a transport layer, and only an IP and a port number are used to identify different connections. In an embodiment of the application, a Transaction-ID identifier is carried in an application layer DNS protocol header, and marks a group including a DNS outbound packet (or a request packet) and a corresponding inbound packet (or a corresponding response packet).

In an embodiment, for a packet transmitted in an embodiment of the application, a new dimension Transaction-ID is introduced to form a six-tuple based on transmission of a conventional packet by using a quintuple (namely, a source IP address, a source port, a destination IP address, a destination port, and a transport layer protocol), so that existing different connections that are identified by using only an IP or only an IP and a port number are different connections that are identified by using an IP, a port number, and a Transaction-ID. Each external network IP has 65536 UDP ports (namely, 65536 port numbers), and each UDP port has 65536 Transaction-IDs. Theoretically, a NAT translation ratio of DNS service flows may be increased to 1:65536 (65536 ports of one external network IP)*65536 (65536 Transaction-IDs of one port). That is, a Transaction-ID of any port (UDP port) of an external network IP may provide a service for an internal network IP, a ratio of translation between an external network IP and an internal network IP may be increased to 1:4294967296.

In addition, for determining whether the received outbound packet is a DNS packet, the NAT device may perform the determining in a manner of identifying whether the outbound packet complies with a DNS protocol format specification, whether to send the outbound packet to a DNS server (for example, whether a destination IP is an IP of the DNS server), or the like. For determining whether the received inbound packet is a DNS packet, the NAT device may perform the determining in a manner of identifying whether the inbound packet complies with a DNS protocol format specification, whether the inbound packet is from a DNS server (for example, whether a source IP is an IP of the DNS server), or the like. Details are not described in this application.

In addition, it should be understood that, in an embodiment of the application, the outbound packet is a packet sent by the internal network device to the external network, namely, a packet sent by an internal network to the external network. For the outbound packet, a source IP, a source port number, and the Transaction-ID carried in the outbound packet are an internal network IP, an internal network port number, and the internal network Transaction-ID, and need to be translated into an external network IP, an external network port number, and an external network Transaction-ID when passing through the NAT device. The inbound packet is a packet sent from an external network device to the internal network, namely, a packet sent from the external network to the internal network. For the inbound packet, a destination IP, a destination port number, and the Transaction-ID carried in the inbound packet are the external network IP, the external network port number, and the external network Transaction-ID, and need to be translated into the internal network IP, the internal network port number, and the internal network Transaction-ID when passing through the NAT device.

S202: The NAT device assigns the external network IP, the external network port number, and the external network Transaction-ID to the outbound packet.

In an embodiment of the application, the NAT device may perform NAT translation in a manner such as static translation or dynamic translation. The static translation means that the IP address, the port number, and the Transaction-ID are in one-to-one mapping and are fixed. A group including an internal network IP address, an internal network port number, and an internal network Transaction-ID can only be translated into (or mapped to) a group including an external network IP address, an external network port number, and an external network Transaction-ID.

The dynamic translation means that when a group including an internal network IP address, an internal network port number, and an internal network Transaction-ID is translated into a group including an external network IP address, an external network port number, and an external network Transaction-ID, the external network IP address, the external network port number, and the external network Transaction-ID are not fixed and can be randomly translated into any specified valid external network IP address, external network port number, and external network Transaction-ID. This may apply to a scenario in which an enterprise has only one external network IP but a plurality of devices need to be accessed by the internet or access the internet. The following uses the static translation and the dynamic translation as examples for description.

Manner 1: Static translation.

A user may configure a NAT mapping table based on an internal network IP, an internal network port number, and an internal network Transaction-ID used by each internal network device in the internal network and a resource set of external network IPs, external network port numbers, and external network Transaction-IDs that may be used by the NAT device. The NAT mapping table includes a plurality of mapping relationships between an internal network IP, an internal network port number, and an internal Transaction-ID and an external network IP, an external network port number, and an external network Transaction-ID. After receiving the outbound packet sent by the internal network device to the external network, the NAT device searches, based on the source IP, the source port number, and the internal network Transaction-ID of the outbound packet, the NAT mapping table for a group including an external network IP, an external network port number, and an external network Transaction-ID that has a mapping relationship with the source IP, the source port number, and the internal network Transaction-ID of the outbound packet, and assigns the external network IP, the external network port number, and the external network Transaction-ID to the outbound packet.

The resource set of external network IPs, external network port numbers, and external network Transaction-IDs that may be used by the NAT device may be determined based on one or more external network IPs of the NAT device. Each external network IP has 65536 UDP ports, each UDP port has 65536 Transaction-IDs, and one external network IP may correspond to 4294967296 groups including external network IPs, external network port numbers, and external network Transaction-ID resources.

In an embodiment, the user may further limit a port number that may be used by an IP of the NAT device and/or a Transaction-ID that may be used by each available port. The NAT device determines the resource set of external network IPs, external network port numbers, and external network Transaction-IDs based on the port number that may be used by the IP of the NAT device and/or the Transaction-ID that may be used by each available port. In an embodiment, the resource set of external network IPs, external network port numbers, and external network Transaction-IDs of the NAT device may alternatively be directly configured by the user. This is not limited in this application.

In an example, the NAT mapping table stored in the NAT device is shown in Table 3. Assuming that the source IP carried in the outbound packet received by the NAT device is a UIP1, the source port number is a UPort1, and the internal network Transaction-ID is 11111, the external network IP "EIP1", the external network port number "EPort1", and the external network Transaction-ID "1" are assigned to the outbound packet. For example, according to the NAT mapping table 1, the source IP (Src IP), the source port number (Src Port), and the internal network Transaction-ID of the outbound packet, and the source IP, the source port number, and the external network Transaction-ID after replacement may be shown in Table 4.

Manner 2: Dynamic assignment.

A group including an unoccupied external network IP, an external network port number, and an external network Transaction-ID is assigned to the outbound packet in a resource set of external network IPs, external network port numbers, and external network Transaction-IDs.

In an example, after receiving the outbound packet sent by the internal network device to the external network, the NAT device may assign, in a sequential assignment manner, the group including an unoccupied external network IP, an external network port number, and an external network Transaction-ID to the outbound packet in the resource set of external network IPs, external network port numbers, and external network Transaction-IDs For example, the network device may assign the group including an unoccupied external network IP, an external network port number, and an external network Transaction-ID to the outbound packet in the resource set of external network IPs, external network port numbers, and external network Transaction-IDs in a manner of assigning the external network IPs in ascending order, the external network port numbers in ascending order, and the external network Transaction-IDs in ascending order.

It should be understood that, after receiving the outbound packet sent by the internal network device to the external network, the NAT device may further assign, in an assignment manner such as random assignment or assignment according to a specified assignment policy, the group including an unoccupied external network IP, an external network port number, and an external network Transaction-ID to the outbound packet in the resource set of external network IPs, external network port numbers, and external network Transaction-IDs.

In a possible embodiment, the NAT device may further assign only one external network IP and one external network port number for each internal network IP of the internal network device. After receiving the outbound packet

TABLE 3

| Internal network IP | Internal network port number | Internal network Transaction-ID | Mapping | External network IP | External network port number | External network Transaction-ID |
|---|---|---|---|---|---|---|
| UIP1 | UPort1 | 11111 | | EIP1 | EPort1 | 1 |
| UIP1 | UPort1 | 11112 | | EIP1 | EPort1 | 2 |
| UIP1 | UPort2 | 11111 | | EIP1 | EPort1 | 3 |
| UIP1 | UPort3 | 11113 | | EIP1 | EPort1 | 4 |
| UIP2 | UPort4 | 11114 | | EIP1 | EPort1 | 5 |

TABLE 4

| Outbound packet (internal network) | | | | | | Outbound packet (external network) | | | | | |
|---|---|---|---|---|---|---|---|---|---|---|---|
| Prot | Src IP | Src Port | Dst IP | Dst Port | Transaction-ID | Prot | Src IP | Src Port | Dst IP | Dst Port | Transaction-ID |
| UDP | UIP1 | UPort1 | DIP1 | DPort1 | 11111 | UDP | EIP1 | EPort1 | DIP1 | DPort1 | 1 |
| UDP | UIP1 | UPort1 | DIP1 | DPort1 | 11112 | UDP | EIP1 | EPort1 | DIP1 | DPort1 | 2 |
| UDP | UIP1 | UPort2 | DIP1 | DPort1 | 11111 | UDP | EIP1 | EPort1 | DIP1 | DPort1 | 3 |
| UDP | UIP1 | UPort3 | DIP1 | DPort1 | 11113 | UDP | EIP1 | EPort1 | DIP1 | DPort1 | 4 |
| UDP | UIP2 | UPort4 | DIP1 | DPort1 | 11114 | UDP | EIP1 | EPort1 | DIP1 | DPort1 | 5 |
| UDP | UIP3 | UPort5 | DIP1 | DPort1 | 11115 | UDP | EIP1 | EPort1 | DIP1 | DPort1 | 6 | sent by the internal network device to the external network, the NAT device may assign the external network IP and the external network port number (where the static assignment or the dynamic assignment may be used) to the outbound packet based on the source IP (namely, the internal network IP) to the outbound packet, and keep the external network Transaction-ID and the internal network Transaction-ID of the outbound packet unchanged. The source IP (Src IP), the source port number (Src Port), and the internal network Transaction-ID of the outbound packet, and the corresponding external network IP, external network port number, and external network Transaction-ID may be shown in Table 5.

TABLE 5

| | Outbound packet (internal network) | | | | | Outbound packet (external network) | | | | |
|---|---|---|---|---|---|---|---|---|---|---|
| Prot | Src IP | Src Port | Dst IP | Dst Port | Transaction-ID | Prot | Src IP | Src Port | Dst IP | Dst Port | Transaction-ID |
| UDP | UIP1 | UPort1 | DIP1 | DPort1 | 11111 | UDP | EIP1 | EPort1 | DIP1 | DPort1 | 11111 |
| UDP | UIP1 | UPort1 | DIP1 | DPort1 | 11111 | UDP | EIP1 | EPort1 | DIP1 | DPort1 | 11111 |
| UDP | UIP1 | UPort2 | DIP1 | DPort1 | 11112 | UDP | EIP1 | EPort1 | DIP1 | DPort1 | 11112 |
| UDP | UIP1 | UPort3 | DIP1 | DPort1 | 11113 | UDP | EIP1 | EPort1 | DIP1 | DPort1 | 11113 |
| UDP | UIP2 | UPort4 | DIP1 | DPort1 | 11114 | UDP | EIP1 | EPort2 | DIP1 | DPort1 | 11114 |
| UDP | UIP3 | UPort5 | DIP1 | DPort1 | 11115 | UDP | EIP1 | EPort3 | DIP1 | DPort1 | 11115 |

S203: The NAT device replaces the source IP, the source port number, and the internal network Transaction-ID of the outbound packet with the external network IP, the external network port number, and the external network Transaction-ID, and then sends the outbound packet.

In an embodiment, to facilitate identification and determination of the internal network IP, the internal network port number, and the internal network Transaction-ID that correspond to the inbound packet sent from the external network to the internal network device, and ensure reliability of transmission of the inbound packet, if the dynamic translation manner is used, the NAT device replaces the source IP, the source port number, and the internal network Transaction-ID of the outbound packet with the external network IP, the external network port number, and the internal network Transaction-ID, and records a mapping relationship between the source IP (namely, the internal network IP), the source port number (namely, the internal network port number), and the internal network Transaction-ID of the outbound packet and the external network IP, the external network port number, and the external network Transaction-ID that are assigned to the outbound packet into the NAT mapping table.

After receiving the packet sent by the internal network device, the external network device responds to the packet sent by the internal network device. When receiving the inbound packet sent by the external network device to the internal network device, the NAT device may assign the internal network IP, the internal network port number, and the internal network Transaction-ID to the inbound packet based on the stored NAT mapping table and the destination IP, the destination port number, and the external network Transaction-ID of the inbound packet, replaces the destination IP, the destination port number, and the external network Transaction-ID of the inbound packet with the internal network IP, the internal network port number, and the internal network Transaction-ID, and then sends the inbound packet.

In an example, assuming that the NAT mapping table is shown in Table 3, and assuming that the destination IP of the inbound packet is an EIP1, the destination port number is an EPort1, and the external network Transaction-ID is 5, the internal network IP UIP2, the internal network port number UPort4, and the internal network Transaction-ID 11114 are assigned to the inbound packet.

The foregoing mainly describes the solutions provided in this application from a perspective of a NAT device. It may be understood that, to implement the foregoing functions, the NAT device includes a corresponding hardware structure and/or software module (or unit) for performing each function. Persons skilled in the art should easily be aware that, in combination with units and algorithm operations of the examples described in embodiments disclosed in this specification, this application may be implemented by hardware or a combination of hardware and computer software. Whether a function is performed by hardware or hardware driven by computer software depends on particular applications and design constraints of the technical solutions. Persons skilled in the art may use different methods to implement the described functions for each particular application, but it should not be considered that the implementation goes beyond the scope of this application.

Figure 3:
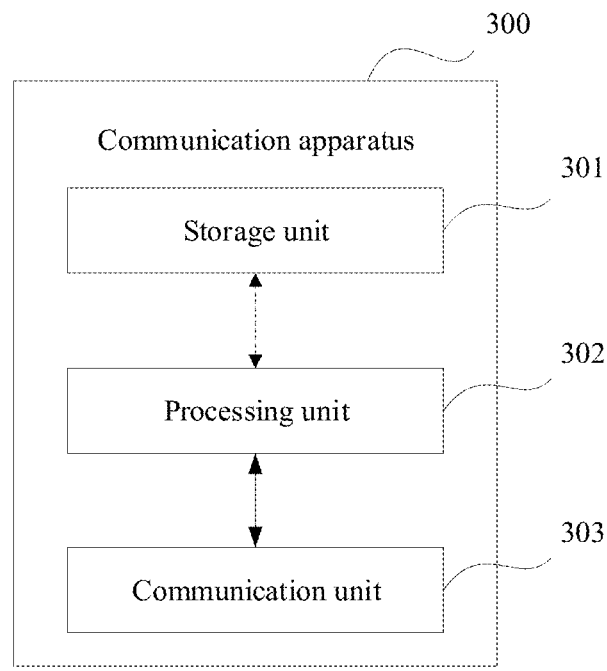
FIG. 3 is a first schematic diagram of a structure of a communication apparatus according to an embodiment of this application.

FIG. 3 is a schematic diagram of a possible structure of a communication apparatus according to an embodiment of this application. The communication apparatuses may be configured to implement functions of the NAT device in the foregoing method embodiments. Therefore, beneficial effects of the foregoing method embodiments can also be implemented. In an embodiment of the application, the communication apparatus may be the NAT device in FIG. 2, or may be a unit (or module) or the like used in the NAT device.

As shown in FIG. 3, the communication apparatus 300 may include a processing unit 302 and a communication unit 303, and may further include a storage unit 301. The communication apparatus 300 is configured to implement a function of the NAT device in the method embodiment shown in FIG. 2.

In an embodiment, the processing unit 302 is configured to implement a corresponding processing function. The communication unit 303 is configured to support the communication apparatus 300 in communicating with another network entity. The storage unit 301 is configured to store program code and/or data of the communication apparatus 300. In an embodiment, the communication unit 303 may include a receiving unit and/or a sending unit, which are respectively configured to perform a receiving operation and a sending operation.

When the communication apparatus 300 is configured to implement the functions of the NAT device in the method embodiments, the communication unit 303 is configured to receive an outbound packet sent by an internal network device to an external network, where the outbound packet carries an internal network Transaction-ID, and the Transaction-ID marks a group including a domain name system DNS outbound packet and a corresponding inbound packet; the processing unit 302 is configured to: assign an external network IP, an external network port number, and an external network Transaction-ID to the outbound packet; and replace a source IP, a source port number, and the internal network Transaction-ID of the outbound packet with the external network IP, the external network port number, and the external network Transaction-ID; and the communication unit 303 is further configured to send the outbound packet processed by the processing unit 302.

In an embodiment, when assigning the external network IP, the external network port number, and the external network Transaction-ID to the outbound packet, the processing unit 302 is configured to: assign the external network IP, the external network port number, and the external network Transaction-ID to the outbound packet based on a configured network address translation NAT mapping table and the source IP, the source port number, and the internal network Transaction-ID that are of the outbound packet, where the NAT mapping table includes a plurality of mapping relationships between an internal network IP, an internal network port number, and an internal network Transaction-ID and an external network IP, an external network port number, and an external network Transaction-ID.

In an embodiment, when assigning the external network IP, the external network port number, and the external network Transaction-ID to the outbound packet, the processing unit 302 is configured to: assign a group including an unoccupied external network IP, an external network port number, and an external network Transaction-ID to the outbound packet in a resource set of external network IPs, external network port numbers, and external network Transaction-IDs.

In an embodiment, the external network Transaction-ID assigned to the outbound packet is the same as or different from the internal network Transaction-ID of the outbound packet.

In an embodiment, the processing unit 302 is further configured to record, in a NAT mapping table, a mapping relationship between the source IP, the source port number, and the internal network Transaction-ID that are of the outbound packet and the external network IP, the external network port number, and the external network Transaction-ID that are assigned to the outbound packet.

In an embodiment, the communication unit 303 is further configured to receive the inbound packet sent by the external network to the internal network device, where the inbound packet carries the external network Transaction-ID; the processing unit 302 is further configured to: assign the internal network IP, the internal network port number, and the internal network Transaction-ID to the inbound packet based on the NAT mapping table and a destination IP, a destination port number, and the external network Transaction-ID that are of the inbound packet; and replace the destination IP, the destination port number, and the external network Transaction-ID of the inbound packet with the internal network IP, the internal network port number, and the internal network Transaction-ID; and the communication unit 303 is further configured to send the inbound packet processed by the processing unit 302.

Figure 4:
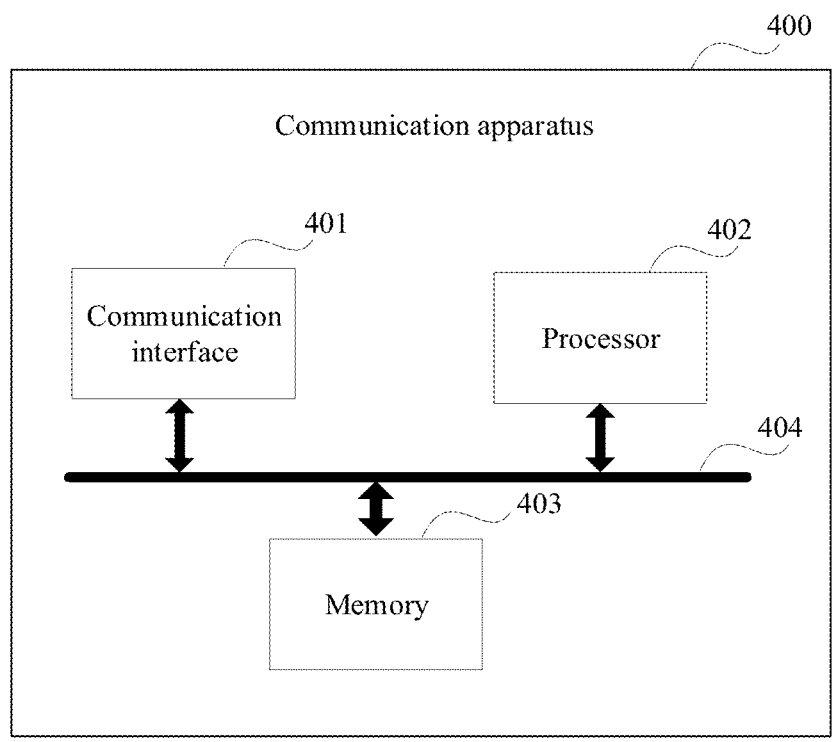
FIG. 4 is a second diagram of a structure of a communication apparatus according to an embodiment of this application.

Based on the foregoing embodiments, an embodiment of this application further provides a communication apparatus. Refer to FIG. 4. The communication apparatus 400 includes a communication interface 401, a processor 402, and a memory 403.

The communication interface 401, the processor 402, and the memory 403 are connected to each other. In an embodiment, the communication interface 401, the processor 402, and the memory 403 are connected to each other through a bus 404. The bus 404 may be a peripheral component interconnect (PCI) bus, an extended industry standard architecture (EISA) bus, or the like. The bus may be classified into an address bus, a data bus, a control bus, and the like. For ease of representation, the bus is represented by using only one bold line in FIG. 4. However, this does not indicate that there is only one bus or only one type of bus.

When the communication apparatus 400 implements the communication method applicable to the NAT device shown in FIG. 2, the communication interface 401 is configured to receive and send data; and the processor 402 is configured to invoke program instructions stored in the memory to perform the following method:

receiving, through the communication interface 401, an outbound packet sent by an internal network device to an external network, where the outbound packet carries an internal network Transaction-ID, and the Transaction-ID marks a group including a domain name system DNS outbound packet and a corresponding inbound packet; assigning an external network IP, an external network port number, and an external network Transaction-ID to the outbound packet; and replacing a source IP, a source port number, and the internal network Transaction-ID of the outbound packet with the external network IP, the external network port number, and the external network Transaction-ID, and then sending the outbound packet through the communication interface 401.

In an embodiment, the assigning an external network IP, an external network port number, and an external network Transaction-ID to the outbound packet includes: assigning the external network IP, the external network port number, and the external network Transaction-ID to the outbound packet based on a configured network address translation NAT mapping table and the source IP, the source port number, and the internal network Transaction-ID that are of the outbound packet, where the NAT mapping table includes a plurality of mapping relationships between an internal network IP, an internal network port number, and an internal network Transaction-ID and an external network IP, an external network port number, and an external network Transaction-ID.

In an embodiment, the assigning an external network IP, an external network port number, and an external network Transaction-ID to the outbound packet includes: assigning a group including an unoccupied external network IP, an external network port number, and an external network Transaction-ID to the outbound packet in a resource set of external network IPs, external network port numbers, and external network Transaction-IDs.

In an embodiment, the external network Transaction-ID assigned to the outbound packet is the same as or different from the internal network Transaction-ID of the outbound packet.

In an embodiment, the method further includes: recording, into a NAT mapping table, a mapping relationship between the source IP, the source port number, and the internal network Transaction-ID that are of the outbound packet and the external network IP, the external network port number, and the external network Transaction-ID that are assigned to the outbound packet.

In an embodiment, the method further includes: receiving, through the communication interface 401, the inbound packet sent by the external network to the internal network device, where the inbound packet carries the external network Transaction-ID; assigning the internal network IP, the internal network port number, and the internal network Transaction-ID to the inbound packet based on the NAT mapping table and a destination IP, a destination port number, and the external network Transaction-ID that are of the inbound packet; and replacing the destination IP, the destination port number, and the external network Transaction-ID of the inbound packet with the internal network IP, the internal network port number, and the internal network Transaction-ID, and then sending the inbound packet through the communication interface 401.

In an embodiment, a computer-readable storage medium is provided. The computer-readable storage medium stores instructions. When the instructions are executed, the communication method applicable to the NAT device in the foregoing method embodiments may be performed.

In an embodiment, a computer program product includes instructions is provided. When the instructions are executed, the communication method applicable to the NAT device in the foregoing method embodiment may be performed.

In an embodiment, a chip is provided. When running, the chip may perform the communication method applicable to the NAT device in the foregoing method embodiments.

Persons skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a function in one or more processes in the flowcharts and/or in one or more blocks in the block diagrams.

These computer program instructions may alternatively be stored in a computer-readable memory that can instruct the computer or any other programmable data processing device to work in a manner, so that the instructions stored in the computer-readable memory generate an artifact that includes an instruction apparatus. The instruction apparatus implements a function in one or more processes in the flowcharts and/or in one or more blocks in the block diagrams.

The computer program instructions may alternatively be loaded onto a computer or another programmable data processing device, so that a series of operations and operations are performed on the computer or the another programmable device, so that computer-implemented processing is generated. Therefore, the instructions executed on the computer or the another programmable device provide operations for implementing a function in one or more procedures in the flowcharts and/or in one or more blocks in the block diagrams.

Although some preferred embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Clearly, persons skilled in the art can make various modifications and variations to embodiments of this application without departing from the spirit and scope of embodiments of this application. This application is intended to cover these modifications and variations provided that these modifications and variations in embodiments of this application fall within the scope of protection defined by the claims in this application and their equivalent technologies.

What is claimed is:

1. A communication method, comprising:
receiving a domain name system (DNS) outbound packet sent by an internal network device to an external network, wherein the DNS outbound packet carries an internal network transaction identifier (Transaction-ID), and the Transaction-ID marks a group comprising the DNS outbound packet and a corresponding inbound packet, wherein the Transaction-ID is used as part of network address translation between an external network IP address and an internal network IP address to improve utilization of the external network IP address;
assigning an external network internet protocol (IP), an external network port number, and an external network Transaction-ID to the DNS outbound packet, wherein the assigning the external network IP, the external network port number, and the external network Transaction-ID to the DNS outbound packet comprises:
assigning a group comprising an unoccupied external network IP, an unoccupied external network port number, and an unoccupied external network Transaction-ID to the DNS outbound packet in a resource set of external network IPs, external network port numbers, and external network Transaction-IDs;
replacing a source IP, a source port number, and the internal network Transaction-ID of the DNS outbound packet with the external network IP, the external network port number, and the external network Transaction-ID; and
sending the DNS outbound packet.

2. The method according to claim 1, wherein the assigning the external network IP, the external network port number, and the external network Transaction-ID to the DNS outbound packet comprises:
assigning the external network IP, the external network port number, and the external network Transaction-ID to the DNS outbound packet based on a configured network address translation (NAT) mapping table and the source IP, the source port number, and the internal network Transaction-ID of the DNS outbound packet, wherein the NAT mapping table comprises a plurality of mapping relationships between an internal network IP, an internal network port number, and an internal network Transaction-ID and an external network IP, an external network port number, and an external network Transaction-ID.

3. The method according to claim 1, wherein the external network Transaction-ID assigned to the DNS outbound packet is the same as or different from the internal network Transaction-ID of the DNS outbound packet.

4. The method according to claim 1, further comprising:
recording, into a NAT mapping table, a mapping relationship between the source IP, the source port number, and the internal network Transaction-ID of the DNS outbound packet and the external network IP, the external network port number, and the external network Transaction-ID assigned to the DNS outbound packet.

5. The method according to claim 2, further comprising:
receiving the inbound packet sent by the external network to the internal network device, wherein the inbound packet carries the external network Transaction-ID;
assigning the internal network IP, the internal network port number, and the internal network Transaction-ID to the inbound packet based on the NAT mapping table and a destination IP, a destination port number, and the external network Transaction-ID of the inbound packet; and
replacing the destination IP, the destination port number, and the external network Transaction-ID of the inbound packet with the internal network IP, the internal network port number, and the internal network Transaction-ID, and then sending the inbound packet.

6. An integrated circuit, wherein the integrated circuit is configured to execute a computer program or instructions stored in a memory, to implement the method according to claim 1.

7. A computer program product, comprising a non-transitory machine-readable storage medium having instructions stored therein, which when executed by a processor, cause the processor to perform the method according to claim 1.

8. A communication apparatus, comprising:
a processor,
a memory coupled to the processor to store instructions, which when executed by the processor, cause the processor to:
receive a domain name system (DNS) outbound packet sent by an internal network device to an external network, wherein the DNS outbound packet carries an internal network transaction identifier (Transaction-ID), and the Transaction-ID marks a group comprising the DNS outbound packet and a corresponding inbound packet, wherein the Transaction-ID is used as part of network address translation between an external network IP address and an internal network IP address; and
assign an external network internet protocol (IP), an external network port number, and an external network Transaction-ID to the DNS outbound packet, wherein when assigning the external network IP, the external network port number, and the external network Transaction-ID to the DNS outbound packet, the processor is configured to:
assign a group comprising an unoccupied external network IP, an unoccupied external network port number, and an unoccupied external network Transaction-ID to the outbound packet in a resource set of external network IPs, external network port numbers, and external network Transaction-IDs;
replace a source IP, a source port number, and the internal network Transaction-ID of the DNS outbound packet with the external network IP, the external network port number, and the external network Transaction-ID; and
send the DNS outbound packet.

9. The communication apparatus according to claim 8, wherein when assigning the external network IP, the external network port number, and the external network Transaction-ID to the DNS outbound packet, the processor is configured to:
assign the external network IP, the external network port number, and the external network Transaction-ID to the DNS outbound packet based on a configured network address translation (NAT) mapping table and the source IP, the source port number, and the internal network Transaction-ID of the DNS outbound packet, wherein the NAT mapping table comprises a plurality of mapping relationships between an internal network IP, an internal network port number, and an internal network Transaction-ID and an external network IP, an external network port number, and an external network Transaction-ID.

10. The communication apparatus according to claim 8, wherein the external network Transaction-ID assigned to the DNS outbound packet is the same as or different from the internal network Transaction-ID of the DNS outbound packet.

11. The communication apparatus according to claim 8, wherein the processor is further configured to:
record, into a NAT mapping table, a mapping relationship between the source IP, the source port number, and the internal network Transaction-ID of the DNS outbound packet and the external network IP, the external network port number, and the external network Transaction-ID assigned to the DNS outbound packet.

12. The communication apparatus according to claim 9, wherein
the processor is further configured to:
receive the inbound packet sent by the external network to the internal network device, wherein the inbound packet carries the external network Transaction-ID;
assign the internal network IP, the internal network port number, and the internal network Transaction-ID to the inbound packet based on the NAT mapping table and a destination IP, a destination port number, and the external network Transaction-ID of the inbound packet; and
replace the destination IP, the destination port number, and the external network Transaction-ID of the inbound packet with the internal network IP, the internal network port number, and the internal network Transaction-ID; and
send the inbound packet.

13. A non-transitory machine-readable storage medium having instructions stored therein, which when executed by a processor, cause the processor to perform operations, the operations comprising:
receiving a domain name system (DNS) outbound packet sent by an internal network device to an external network, wherein the DNS outbound packet carries an internal network transaction identifier (Transaction-ID), and the Transaction-ID marks a group comprising the DNS outbound packet and a corresponding inbound packet, wherein the Transaction-ID is used as part of network address translation between an external network IP address and an internal network IP address;
assigning an external network internet protocol (IP), an external network port number, and an external network Transaction-ID to the DNS outbound packet, wherein the assigning the external network IP, the external network port number, and the external network Transaction-ID to the DNS outbound packet comprises:
  assigning a group comprising an unoccupied external network IP, an unoccupied external network port number, and an unoccupied external network Transaction-ID to the DNS outbound packet in a resource set of external network IPs, external network port numbers, and external network Transaction-IDs;
  replacing a source IP, a source port number, and the internal network Transaction-ID of the DNS outbound packet with the external network IP, the external network port number, and the external network Transaction-ID; and
  sending the DNS outbound packet.

14. The non-transitory machine-readable storage medium according to claim 13, wherein the assigning the external network IP, the external network port number, and the external network Transaction-ID to the DNS outbound packet comprises:
  assigning the external network IP, the external network port number, and the external network Transaction-ID to the DNS outbound packet based on a configured network address translation (NAT) mapping table and the source IP, the source port number, and the internal network Transaction-ID of the DNS outbound packet, wherein the NAT mapping table comprises a plurality of mapping relationships between an internal network IP, an internal network port number, and an internal network Transaction-ID and an external network IP, an external network port number, and an external network Transaction-ID.

15. The non-transitory machine-readable storage medium according to claim 13, wherein the external network Transaction-ID assigned to the DNS outbound packet is the same as or different from the internal network Transaction-ID of the DNS outbound packet.

16. The non-transitory machine-readable storage medium according to claim 13, wherein the operations further comprise:
  recording, into a NAT mapping table, a mapping relationship between the source IP, the source port number, and the internal network Transaction-ID of the DNS outbound packet and the external network IP, the external network port number, and the external network Transaction-ID assigned to the DNS outbound packet.

17. The non-transitory machine-readable storage medium according to claim 14, wherein the operations further comprise:
  receiving the inbound packet sent by the external network to the internal network device, wherein the inbound packet carries the external network Transaction-ID;
  assigning the internal network IP, the internal network port number, and the internal network Transaction-ID to the inbound packet based on the NAT mapping table and a destination IP, a destination port number, and the external network Transaction-ID of the inbound packet; and
  replacing the destination IP, the destination port number, and the external network Transaction-ID of the inbound packet with the internal network IP, the internal network port number, and the internal network Transaction-ID, and then sending the inbound packet.

* * * * *